United States Patent
Cao et al.

(10) Patent No.: US 12,218,364 B2
(45) Date of Patent: Feb. 4, 2025

(54) BATTERY MODULE AND APPARATUS

(71) Applicant: CONTEMPORARY AMPEREX TECHNOLOGY (HONG KONG) LIMITED, Hong Kong (CN)

(72) Inventors: Gen Cao, Ningde (CN); Jihua Yao, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 1085 days.

(21) Appl. No.: 17/123,550

(22) Filed: Dec. 16, 2020

(65) Prior Publication Data

US 2021/0104797 A1 Apr. 8, 2021

Related U.S. Application Data

(63) Continuation of application No. PCT/CN2020/091645, filed on May 21, 2020.

(30) Foreign Application Priority Data

Jun. 28, 2019 (CN) .......................... 201910574473.5

(51) Int. Cl.
*H01M 50/209* (2021.01)
*H01M 10/48* (2006.01)
(Continued)

(52) U.S. Cl.
CPC ....... *H01M 50/209* (2021.01); *H01M 10/482* (2013.01); *H01M 10/486* (2013.01);
(Continued)

(58) Field of Classification Search
CPC .......... H01M 10/653; H01M 10/6554; H01M 50/287; H01M 50/298; H01M 10/486
See application file for complete search history.

(56) References Cited

U.S. PATENT DOCUMENTS

| | | | |
|---|---|---|---|
| 2016/0380319 A1 | 12/2016 | Rhein et al. | |
| 2017/0098867 A1* | 4/2017 | Zhao | H01M 10/486 |
| 2019/0198842 A1* | 6/2019 | Takada | H01M 50/50 |

FOREIGN PATENT DOCUMENTS

| | | |
|---|---|---|
| CN | 203503754 U | 3/2014 |
| CN | 204029949 U | 12/2014 |

(Continued)

OTHER PUBLICATIONS

Search Report issued on Aug. 12, 2020 in corresponding International Application No. PCT/CN2020/091645; 4 pages.
(Continued)

*Primary Examiner* — Nathanael T Zemui
(74) *Attorney, Agent, or Firm* — Kilpatrick Townsend & Stockton LLP

(57) ABSTRACT

The present application relates to a battery module including: multiple battery units, the battery units being arranged side by side along a length direction of the battery module, the battery unit including a top cover; a circuit board, arranged above the top cover in a height direction, the circuit board being provided with a temperature collection circuit; a heat-conducting element, a first end of the heat-conducting element being connected to the circuit board, and at least part of the heat-conducting element being in contact with the top cover; and a temperature detection component, arranged on the heat-conducting element and signal-connected to the temperature collection circuit.

20 Claims, 9 Drawing Sheets

(51) Int. Cl.

| | | |
|---|---|---|
| *H01M 10/653* | (2014.01) | |
| *H01M 10/6554* | (2014.01) | |
| *H01M 50/249* | (2021.01) | |
| *H01M 50/271* | (2021.01) | |
| *H01M 50/287* | (2021.01) | |
| *H01M 50/298* | (2021.01) | |
| *H01M 50/505* | (2021.01) | |

(52) U.S. Cl.
CPC ..... *H01M 10/653* (2015.04); *H01M 10/6554* (2015.04); *H01M 50/249* (2021.01); *H01M 50/271* (2021.01); *H01M 50/287* (2021.01); *H01M 50/298* (2021.01); *H01M 50/505* (2021.01); *H01M 2220/20* (2013.01)

(56) References Cited

FOREIGN PATENT DOCUMENTS

| CN | 107810567 A | 3/2018 |
|---|---|---|
| CN | 207116634 U | 3/2018 |
| CN | 207183388 U | 4/2018 |
| CN | 207183457 U | 4/2018 |
| CN | 207781834 U | 8/2018 |
| CN | 108735936 A | 11/2018 |
| CN | 208806294 U | 4/2019 |
| CN | 112151895 A | 12/2020 |
| JP | 2016018741 A | 2/2016 |
| JP | 2016090286 A | 5/2016 |
| JP | 2018014294 A | 1/2018 |
| KR | 20170034560 A | 3/2017 |

OTHER PUBLICATIONS

Chinese Office Action issued on Jun. 25, 2021, in connection with corresponding CN Application No. 201910574473.5 (12 pp., including machine-generated English translation).

Written Opinion received in the corresponding International Application PCT/CN2020/091645, mailed Aug. 12, 2020.

The first office action received in the corresponding Chinese Application 202111542742.3, mailed Jul. 18, 2023.

First search report of the corresponding Chinese Application 202111542742.3.

Notification to Grant Patent Right for Invention received in the corresponding Chinese Application 201910574473.5.

First search report of the corresponding Chinese Application 201910574473.5.

Supplementary search report of the corresponding Chinese Application 201910574473.5.

Notification to Grant Patent Right for Invention received in the corresponding Chinese Application 202111542742.3, mailed on Dec. 27, 2023.

* cited by examiner

BATTERY MODULE AND APPARATUS

CROSS-REFERENCE TO RELATED APPLICATION

The present application is a continuation of International Application No. PCT/CN2020/091645, filed May 21, 2020, which claims priority to Chinese Patent Application No. 201910574473.5, filed with the China National Intellectual Property Administration on Jun. 28, 2019 and titled "BATTERY MODULE". The entire contents of which are incorporated in this application by reference.

TECHNICAL FIELD

The present application relates to the field of battery technologies, and in particular, to a battery module and an apparatus.

BACKGROUND

A normal operating temperature range of a battery module is between −30° C. and 55° C. If an operating temperature of the battery module exceeds the temperature range, power of the battery module will be limited for providing safety protection.

In a prior art known to the inventor, a battery module adopts a temperature-collecting structure as follows. One end of a metal sheet is connected to a busbar, and the other end is provided with a temperature detection component, and the temperature detection component is connected to a circuit board, so that a temperature on the busbar can be collected by the temperature detection component as a temperature inside the battery.

However, the temperature-collecting structure has following problems. Considering space size limitation in the battery module, and influence of manufacturing and cost factors, width and thickness of the busbar are difficult to be made large. Under low operating conditions, such as 1 C discharge, the temperature of the busbar is close to the temperature inside the battery. However, if a higher discharge rate is adopted, the temperature of the busbar far exceeds the temperature inside the battery and a difference between them is relatively large, and the battery module will limit the power, which will affect performance of the battery module. Therefore, it is needed to obtain the temperature inside the battery more accurately.

SUMMARY

Embodiment of the present application provides a battery module, which could improve operating efficiency of the battery module.

According to an aspect of the present application, a battery module is provided, including:
multiple battery units, arranged side by side along a length direction of the battery module, each of the battery units including a top cover;
a circuit board, disposed above the top cover along a height direction, the circuit board being provided with a temperature collection circuit;
a heat-conducting element, a first end of the heat-conducting element being connected to the circuit board, and at least part of the heat-conducting element being in contact with the top cover; and
a temperature detection component, disposed on the heat-conducting element and signal-connected to the temperature collection circuit.

In some embodiments, the battery module further includes:
a wire harness board, disposed on the top cover along the height direction, and the wire harness board including a mounting base disposed close to the circuit board;
where the circuit board is disposed on the wire harness board, and a second end of the heat-conducting element is disposed on the mounting base.

In some embodiments, the heat-conducting element includes:
a first bending portion, configured to be at least partially in contact with the top cover; and
a first mounting portion and a second mounting portion, respectively located at two ends of the first bending portion along a width direction of the battery module, and configured to be fixed to the wire harness board, the first mounting portion being located on a side close to the circuit board, and an end of the first mounting portion away from the first bending portion serving as the first end of the heat-conducting element and being fixed to the circuit board and mounted with the temperature detection component;
where the first bending portion is convex downward relative to a plane where the first mounting portion and the second mounting portion are located.

In some embodiments, the heat-conducting element is formed by bending an elongated plate-shaped structure.

In some embodiments, the first bending portion includes:
a bottom plate, being in contact with the top cover; and
two side plates, upper ends of the two side plates being connected to the first mounting portion and the second mounting portion, respectively, and lower ends of the two side plates being connected to two ends of the bottom plate, respectively.

In some embodiments, a distance between the two side plates gradually decreases from top to bottom, and the bottom plate is a flat plate.

In some embodiments, each of the first mounting portion and the second mounting portion is provided with a second bending portion at a position close to the first bending portion, and the second bending portion is convex downward relative to the plane where the first mounting portion and the second mounting portion are located.

In some embodiments, a size of the second bending portion along the height direction of the battery module is smaller than a size of the first bending portion along the height direction of the battery module; and/or
a size of the second bending portion along the width direction of the battery module is smaller than a size of the first bending portion along the width direction of the battery module.

In some embodiments, a positioning structure is provided between the heat-conducting element and the mounting base, and is configured to position the heat-conducting element.

In some embodiments, a positioning structure is provided between the heat-conducting element and the mounting base, and the positioning structure includes:
a first through hole, disposed on at least one of the first mounting portion and the second mounting portion; and
a positioning post, disposed at a position corresponding to the first through hole on the mounting base, the positioning post being inserted in the first through hole.

In some embodiments, the mounting base is provided with a first through slot, and the heat-conducting element is configured to pass through the first through slot from top to bottom to be in contact with the top cover.

In some embodiments, the battery module further includes:

a busbar, disposed on the wire harness board, the top cover being provided with electrode terminals, and the busbar being connected to the electrode terminals of an adjacent battery unit, the busbar being provided with a second through slot configured to avoid the heat-conducting element, and the busbar being pressed on an upper surface of the mounting base.

In some embodiments, the mounting base is provided with a rib in an area in contact with the busbar, and the busbar is in contact with a top surface of the rib.

In some embodiments, a first end of the heat-conducting element connected to the circuit board is provided with a mounting hole, and the temperature detection component is located in the mounting hole and signal-connected to the temperature collection circuit of the circuit board.

In some embodiments, an area between the mounting hole and the temperature detection component is filled with a thermally conductive adhesive.

In some embodiments, the top cover is provided with electrode terminals, and a contact area between the heat-conducting element and the top cover is disposed close to the electrode terminals.

The embodiment of the present application also provides an apparatus, which includes the battery module in above embodiments, and the battery module is configured to provide electrical energy.

Based on above technical solutions, the battery module of an embodiment of the present application temperature of the top cover to the temperature detection component through the heat-conducting element, which could obtain the true operating temperature inside the battery unit more accurately. Only when the actual temperature inside the battery unit really exceeds the preset threshold value, power limitation control would be performed, which could make the battery module fully exert energy efficiency. In addition, compared with a structure where the temperature detection component is disposed on the top cover through a heat-conducting pad, the heat is transferred through a hard heat-conducting element, and the temperature detection component is fixed on the heat-conducting element, which could avoid a phenomenon that the temperature detection component is not mounted firmly or even falls off when the heat-conducting pad ages or impact or vibration is received, and could improve fixing reliability of the temperature detection component.

BRIEF DESCRIPTION OF DRAWINGS

Drawings described here are used to provide a further understanding of the present application and constitute a part of the present application. Illustrative embodiments of the present application and descriptions thereof are used to explain the present application but do not constitute an improper limitation of the present application. In the accompanying drawings.

DESCRIPTION OF EMBODIMENTS

Figure 1:
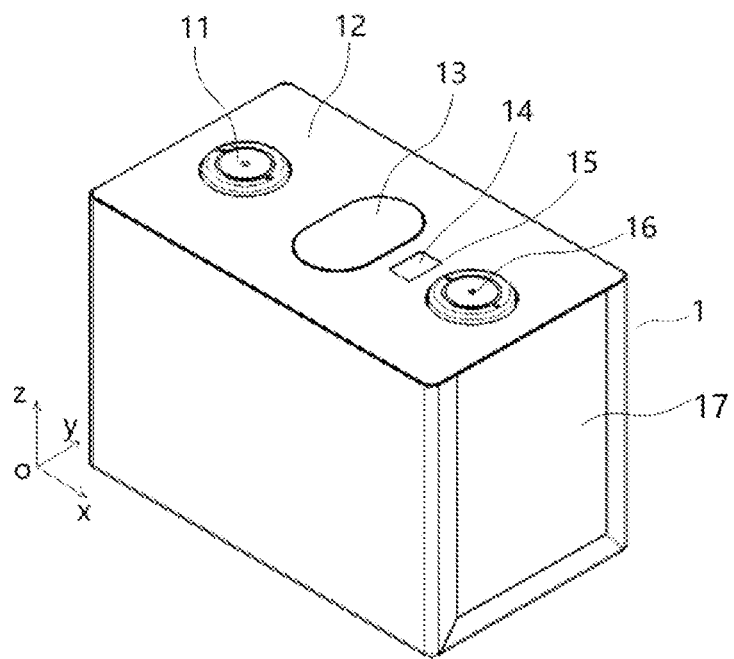
FIG. 1 is a schematic structural diagram of an embodiment of a battery unit in a battery module of the present application.

The present application is explained in detail below. In the following paragraphs, different aspects of the embodiments are defined in more detail. The aspects so defined can be combined with any other aspect or aspects, unless it is clearly indicated that they cannot be combined. In particular, any feature considered to be preferred or advantageous may be combined with one or more other features considered to be preferred or advantageous.

The terms "first" and "second" appearing in the present application are only for the convenience of description, to distinguish different components with the same name, and do not indicate a sequence or a primary-secondary relationship.

In addition, when an element is referred to as being "on" another element, the element may be directly on the other element, or it may be indirectly on the other element with one or more intermediate components. In addition, when an element is referred to as being "connected to" another element, the element may be directly connected to the other element, or may be indirectly connected to the other element with one or more intermediate elements interposed therebetween. In the following, the same reference numerals denote the same elements.

In order to clearly describe various orientations in the following embodiments, a coordinate system in FIG. 14 defines various directions of a battery module. An x direction represents a width direction of the battery module; a y direction is perpendicular to the x direction in a horizontal plane, and represents a length direction of the battery module; a z direction is perpendicular to a plane formed by the x and y directions, and represents a height direction of the battery module.

As shown in FIG. 1, a schematic structural diagram of a battery unit 1 in a battery module is provided. The width direction x of the battery module corresponds to a length direction of the battery unit, the length direction y of the battery module corresponds to a width direction of the battery unit 1, the height direction z of the battery module is consistent with a height direction of the battery unit 1.

Based on this orientation definition, the description of orientations or positional relationships indicated by "above", "under", "top", "bottom", "inner" and "outer" are adopted, which is only for the convenience of describing the present application, but does not indicate or imply that the referred apparatus must have a specific orientation, or be constructed and operated in a specific orientation, and thus cannot be interpreted as limiting the protection scope of the present application.

At present, various vehicle manufacturers in the industry are developing in the direction of coupe type, and traditional modified electric vehicles also need to reflect the advantages and characteristics of fast acceleration of electric vehicles, so a demand for rapid acceleration operating condition will become more and more common, that is, a power requirement will become higher and higher. Under the operating condition of high power, a temperature of the busbar will rise sharply due to the limitation of a current-flowing area of the busbar, while a temperature inside the battery unit will rise slowly. Power limitation caused by temperature mismatch between a temperature of the temperature detection component on the busbar and a temperature inside the battery unit will affect discharge power of the battery module. Therefore, it is necessary to obtain the temperature inside the battery unit of the battery module more accurately.

In order to solve the problem, the inventor thought of directly obtaining a temperature of the battery top cover which could better reflect the actual operating temperature of the battery unit compared with obtaining the temperature of the busbar since the temperature of the top cover is highly synchronized with the temperature inside the battery unit and a surface temperature of the top cover would not be affected by changes in operating current of the battery module.

According to this idea, the present application provides an improved battery module. In order to enable those skilled in the art to clearly understand the improvement points of the present application, an overall structure of the battery module will be described first.

Figure 14:
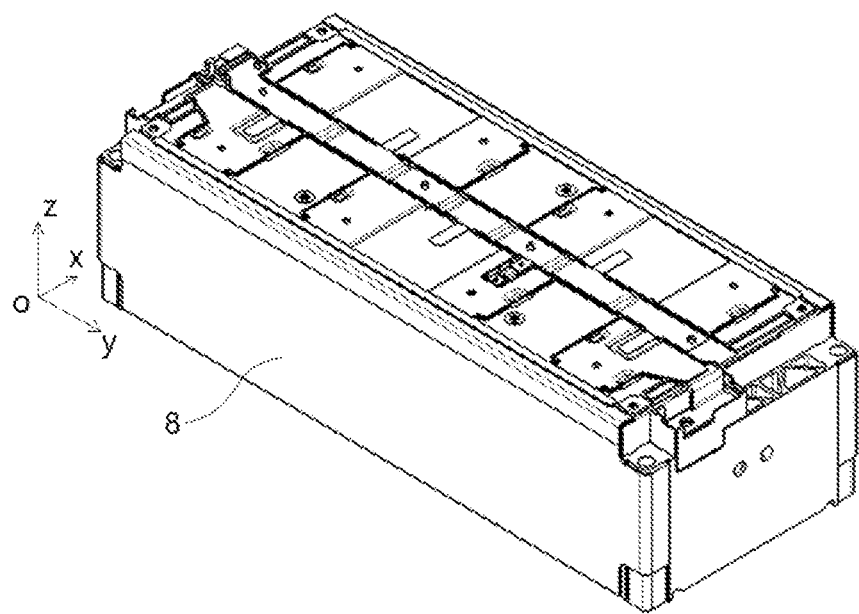
FIG. 14 is a schematic structural diagram of an embodiment of a battery module of the present application.

FIG. 14 shows a schematic structural diagram of an embodiment of a battery module. The battery module includes a second case 8 and a plurality of battery units 1, and the battery units 1 are disposed in the second case 8 and are arranged side by side along a length direction (y direction) of the battery module.

FIG. 1 shows a schematic structural diagram of an embodiment of the battery unit. The battery unit 1 includes a first case 17, a top cover 14, and electrode terminals. A wound electrode assembly or a laminated electrode assembly is accommodated in the first case 17. The top cover 14 is disposed on a top of the first case 17 to close the first case 17. The electrode terminals are disposed on the top cover 14 and include a positive electrode terminal 11 and a negative electrode terminal 16, and tabs of the electrode assembly are respectively connected to the positive electrode terminal 11 and the negative electrode terminal 16 through current collectors. A vent member 13 is provided on the top cover 14, and the vent member 13 is configured to release gas in the battery unit 1 for safety.

In addition, a top patch 12 is provided on the top cover 14. The top patch 12 plays a role of insulation on one hand to prevent the top cover 14 from being short-circuited with external circuits, and on the other hand plays a protective role to prevent the top cover 14 from being scratched. In order to collect a surface temperature of the top cover 14, an opening 15 needs to be opened on the top patch 12 to expose a local area of the top cover 14, and the local area forms a temperature sampling site.

Figure 2:
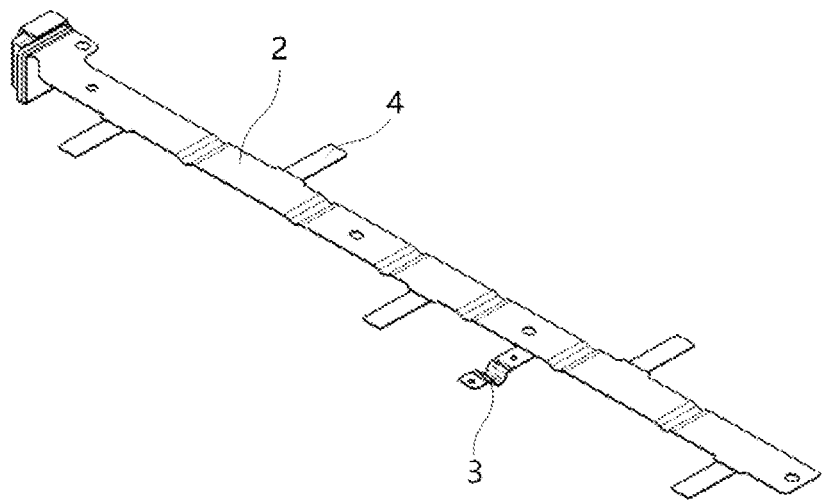
FIG. 2 is a schematic structural diagram of a frontside of an embodiment in which a heat-conducting element is provided on a circuit board in a battery module of the present application.
Figure 5:
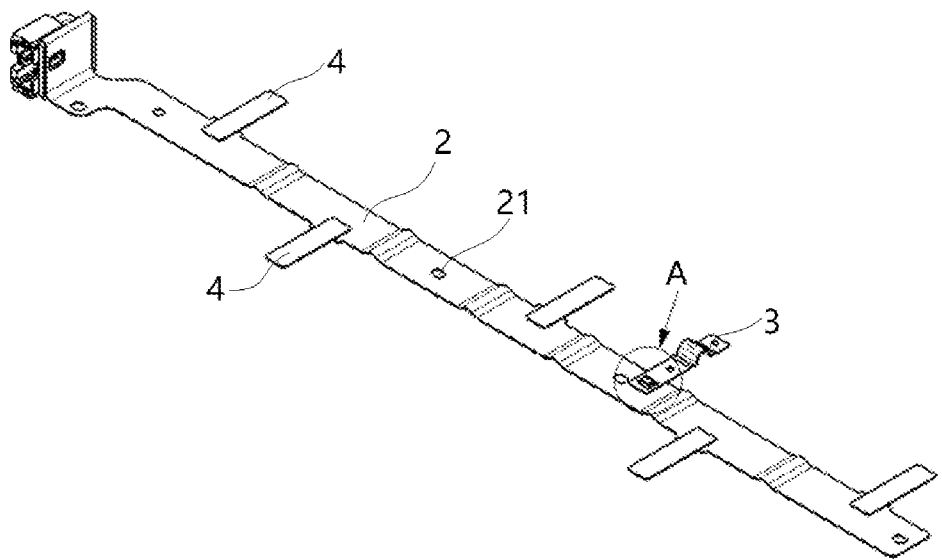
FIG. 5 is a schematic structural diagram of a backside of an embodiment in which a heat-conducting element is provided on a circuit board in a battery module of the present application.
Figure 6:
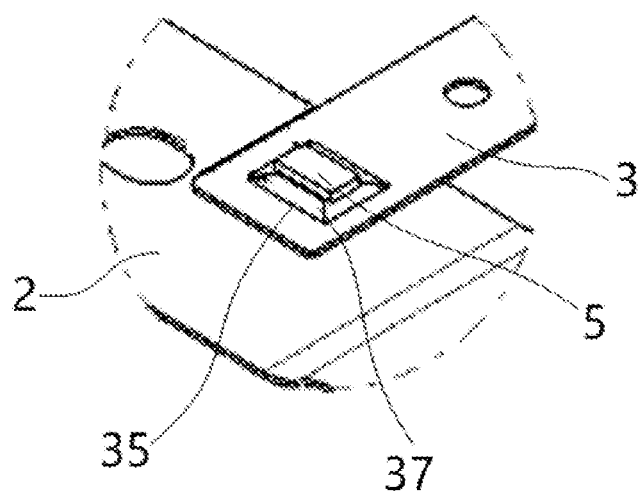
FIG. 6 is an enlarged view of part A in FIG. 5.

In some embodiments, as shown in FIG. 2, FIG. 5, and FIG. 6, the battery module of the present application further includes: a circuit board 2, a heat-conducting element 3, and a temperature detection component 5. The circuit board 2 is disposed above the top cover 14 along a height direction of the battery module, and the circuit board 2 is provided with a temperature collection circuit. A first end of the heat-conducting element 3 is connected to the circuit board 2, and at least part of the heat-conducting element is in contact with the top cover 14. Specifically, at least part of an area other than a connecting portion of the heat-conducting element 3 to the circuit board 2 is in contact with the top cover 14.

The temperature detection component 5 is disposed on the heat-conducting element 3 and is signal-connected to the temperature collection circuit, and for example, a signal can be transferred in a way of wire connection or in a wireless way. In this way, a temperature of the top cover 14 of the battery unit 1 could be transmitted to the temperature detection component 5 through the heat-conducting element 3, and then a temperature signal detected by the temperature detection component 5 is obtained through the temperature collection circuit and converted into an electrical signal.

Optionally, the entire heat-conducting element 3 is in contact with the top cover 14, and the temperature detection component 5 may be disposed on an area on the heat-conducting element 3 near the circuit board 2, or on other areas on the heat-conducting element 3, and is signal-connected to the temperature collection circuit through a wire.

Figure 3:
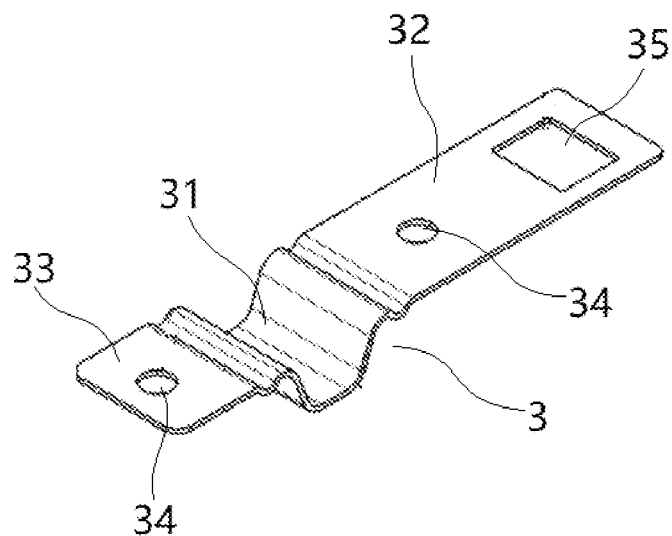
FIG. 3 is a schematic structural diagram of an embodiment of the heat-conducting element in FIG. 2.

As shown in FIG. 3 and FIG. 6, a first end of the heat-conducting element 3 connected to the circuit board 2 is provided with a mounting hole 35, such as a rectangular hole. The temperature detection component 5 is located in the mounting hole 35 and is signal-connected to the temperature collection circuit of the circuit board 2 so that a signal could be transmitted between the temperature detection component 5 and the temperature collection circuit of the circuit board 2.

Specifically, the temperature detection component 5 may be disposed at a bottom of the heat-conducting element 3 to make a mounting surface of the circuit board 2 smoother, so that an overall height of the battery module could be reduced and space under the heat-conducting element 3 could be fully used and a structure could be more compact.

Furthermore, an area between the mounting hole 35 and the temperature detection component 5 is filled with a thermally conductive adhesive 37. The thermally conductive adhesive 37 may be made of materials such as epoxy resin. Suh a structure could fix the temperature detection component 5 reliably, and the elastic thermally conductive adhesive 37 could also absorb vibration transferred by the heat-conducting element 3, reduce vibration of the temperature detection component 5, and improve its operating reliability and service life.

For example, the circuit board 2 may adopt a flexible printed circuit board (Flexible Printed Circuit Board, FPC), or may also adopt a printed circuit board (Printed Circuit Board, PCB). The circuit board 2 may be of an elongated shape, extending along a length direction of the battery module, and may be located in a middle area in a width direction of the battery module.

For example, the heat-conducting element 3 may be made of a metal material or other materials with good thermal conductivity to transfer heat of the top cover 14 quickly and efficiently to the temperature detection component 5 through contact heat conduction. The heat-conducting element 3 may be connected to the circuit board 2 by welding.

For example, the temperature detection component 5 may adopt a negative temperature coefficient (English full name: Negative Temperature Coefficient; NTC for short) thermistor, and its structure may be of a patch type, which could reduce space occupation and facilitate installation, or the temperature detection component 5 may also be other types of thermistors.

In an embodiment, a contact area where the heat-conducting element 3 is in contact with the top cover 14 is disposed close to an electrode terminal. Because a temperature at a position near the electrode terminal is relatively high and close to the operating temperature inside the battery unit 1 during use of the battery module, the actual temperature of the battery module could be more truly reflected.

The battery module of the embodiment of the present application has at least one of the following advantages:

1. The temperature of the top cover 14 of the battery unit 1 is closer to the actual temperature inside the battery unit. Under higher rate discharge conditions, a temperature difference is also within an acceptable range, for example 5° C. Power limitation control would need to be performed only when the actual temperature inside the battery unit 1 really exceeds a preset threshold value, which could make the battery module fully exert energy efficiency.

2. The temperature of the top cover 14 is transferred to a temperature measurement structure of the temperature detection component 5 through the heat-conducting element 3. Compared with a structure where the temperature detection component 5 is directly attached to the top cover through a heat-conducting pad, the thermal pad is omitted, which could simplify structure design. Moreover, the thermal pad is made of a silicon rubber material, and is prone to aging after being heated or used for a long time, which reduces fixing reliability of temperature detection component 5. The solution of the present application transfers heat through the hard heat-conducting element 3 and fixes the temperature detection component 5 on the heat-conducting element 3, which could improve the fixing reliability of the temperature detection component 5, and prevent occurrence of conditions of no temperature signal or inaccurate temperature collection caused by a poor contact between the temperature detection component 5 and top cover 14, and elongate service life.

3. Compared with the structure where the temperature detection component 5 is directly attached to the top cover through the heat-conducting pad, the temperature detection component 5 in this embodiment of the present application is fixed at a position farther away from the top cover 14, which could prevent the impact or vibration received by the battery unit 1 under impact or cyclic operating conditions from being transferred to the temperature detection component 5, and thus avoid a phenomenon that the temperature detection component 5 is not mounted firmly or even falls off.

FIG. 2 schematically shows a schematic structural diagram of a frontside of the circuit board 2, and FIG. 5 schematically shows a schematic structural diagram of a backside of the circuit board 2. The heat-conducting element 3 may be disposed on a side of circuit board 2 along the length direction of the battery module and may extend along the width direction of the battery module.

According to requirements, one heat-conducting element 3, or two or more than two heat-conducting elements 3 may be provided to realize multi-point temperature collection, and the operating temperature of the battery module could be obtained more comprehensively and accurately by a method of averaging temperatures of multiple points. When a temperature difference of different parts exceeds a preset threshold, it may be judged that internal heating of the battery module is uneven, indicating that there may be abnormality, and further the battery module may be stopped from operating.

Furthermore, on a basis of detecting the operating temperature of the battery module, the circuit board 2 may also be connected to an electrically conductive member 4, for example a flat conductive metal sheet. The electrically conductive member 4 may be disposed opposite to the busbar 7, and a voltage collecting circuit is provided inside the circuit board 2 to obtain a operating voltage of the battery module. Electrically conductive members 4 may be distributed on both sides of the circuit board 2 along the length direction of the battery module and arranged alternately at intervals, and a single electrically conductive member 4 extends along the width direction of the battery module. Ends of the heat-conducting element 3 and the electrically conductive member 4 connected to the circuit board 2 are pressed under the circuit board 2 to improve fixing reliability.

Figure 7:
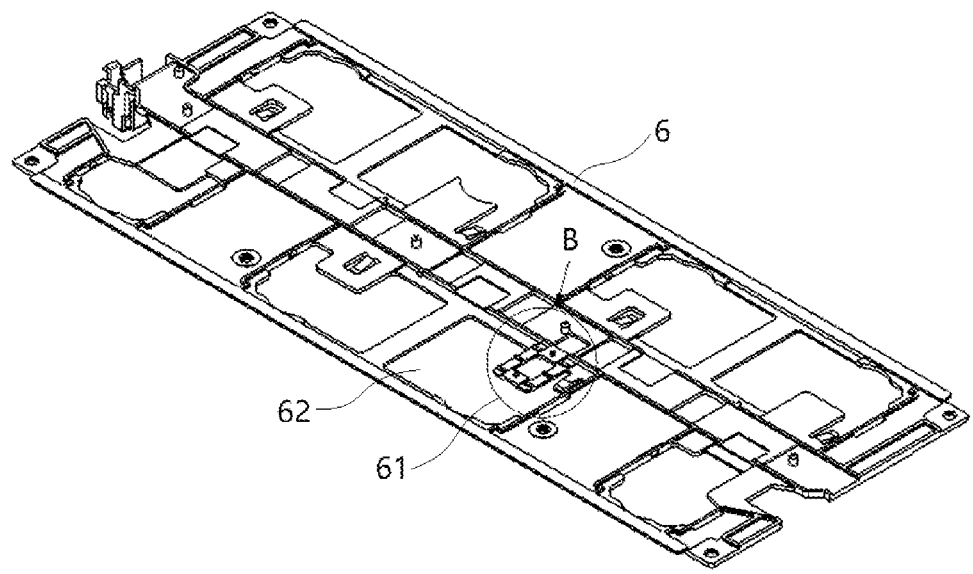
FIG. 7 is a schematic structural diagram of an embodiment in which a mounting base is provided on a wire harness board in a battery module of the present application.

As shown in FIG. 7, the battery module of the present application also includes a wire harness board 6, and the wire harness board 6 is disposed on the top cover 14 of each battery unit 1 along the height direction of the battery module for fixing the circuit board 2. The circuit board 2 is disposed on the wire harness board 6, and the wire harness board 6 includes a mounting base 61 disposed close to the circuit board 2. A first end of the heat-conducting element 3 along the width direction of the battery module is fixed to the circuit board 2, and a second end of the heat-conducting element 3 is disposed on the mounting base 61 and fixed to the wire harness board 6.

For example, as shown in FIG. 7, the wire harness board 6 has a rectangular structure, and its outline covers the top cover 14 of each battery unit 1, and a third through slot 62 is provided on the wire harness board 6 to weld the busbar 7 covering the wire harness board 6 to the electrode terminals, which could also reduce weight of the wire harness board 6 and reduce heat transferred to the wire harness board 6 through the busbar 7.

A middle area along a width direction of the wire harness board 6 forms a circuit board mounting portion, a plurality of third through slots 62 are provided on both sides of the circuit board mounting portion, and the mounting base 61 extends from a side portion of the circuit board mounting portion along the width direction of the wire harness board 6 and is located in the third through slot 62 in a form of a cantilever. A specific structure of the mounting base 61 will be given after description of the heat-conducting element 3.

In this embodiment, the mounting base 61 mainly plays a role of supporting the heat-conducting element 3 and can fix the heat-conducting element 3 reliably. When the battery module is subjected to an external force such as impact and vibration, the wire harness board 6 is mainly relied on to bear the force, and poor contact between the heat-conducting element 3 and top cover 14 due to deformation or dislocation of the heat-conducting element 3 is prevented, which could allow the heat-conducting element 3 and top cover 14 to be in full contact, and thus improve accuracy of battery module temperature detection.

Specific examples of the heat-conducting element 3 will be given in detail below.

In some embodiments, as shown in FIG. 3, the heat-conducting element 3 includes: a first bending portion 31, a first mounting portion 32 and a second mounting portion 33. The first bending portion 31 is configured to be at least partially in contact with the top cover 14. The first mounting portion 32 and the second mounting portion 33 are located at two ends of the first bending portion 31 along the width direction of the battery module, respectively, and are configured to be fixed to the wire harness board 6. The first mounting portion 32 is located at a side close to the circuit board 2, and an end of the first mounting portion 32 away from the first bending portion 31 serves as the first end of the heat-conducting element 3 and is fixed to the circuit board 2 and mounted with the temperature detection component 5.

The first mounting portion 32 and the second mounting portion 33 are overlaid on an upper surface of the mounting base 61, and the first bending portion 31 is convex downward relative to a plane where the first mounting portion 32 and the second mounting portion 33 are located, so that a bottom of the first bending portion 31 is in contact with the top cover 14.

This kind of heat-conducting element 3 could fix both the first mounting portion 32 and the second mounting portion 33 at two ends of the first bending portion 31 to the mounting base 61, and a stable supporting force could be provided for the heat-conducting element 3; moreover, the fixing is reliable, so that the heat-conducting element 3 would not be easy to tilt, and thus the bottom of the first bending portion 31 and the top cover 14 could be in constant contact with each other to achieve reliable heat conduction.

As shown in FIG. 3, the heat-conducting element 3 is formed by bending an elongated plate-shaped structure, which may be formed by stamping and could ensure overall strength, and a thin plate-shaped heat-conducting element 3 could also increase heat transfer speed. Moreover, the heat-conducting element 3 formed by bending is elastic, and pressure can be generated when the heat-conducting element 3 is in contact with the top cover 14.

For example, the heat-conducting element 3 may be made of a metal sheet, and may be formed by fixedly connecting a separate structure, or formed by machining. In addition, thickness of the heat-conducting element 3 may be uniform everywhere, and such a structure has relatively high thermal conductivity, or the thickness of the heat-conducting element 3 may also be different for different parts.

Figure 4:
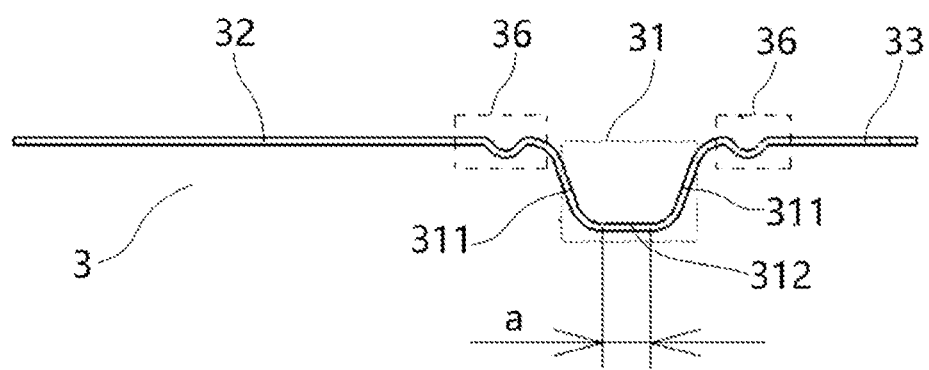
FIG. 4 is a side view of the heat-conducting element shown in FIG. 3.

As shown in FIG. 4, the first bending portion 31 includes a bottom plate 312 and two side plates 311, where the bottom plate 312 is in contact with the top cover 14, upper ends of the two side plates 311 are respectively connected to the first mounting portion 32 and the second mounting portion 33, lower ends of the two side plates 311 are respectively connected to two ends of the bottom plate 312 along the width of the battery module. For example, the two side plates 311 may be symmetrically arranged with respect to the bottom plate 312, and when subjected to impact and vibration, the first bending portion 31 could receive balanced forces, and would not be easy to tilt, so that reliable contact between the bottom plate 312 and the top cover 14 could be ensured to achieve heat conduction.

In an embodiment, positions where the two side plates 311 are connected to the first mounting portion 32 and the second mounting portion 33 and positions where the two side plates 311 are connected to the bottom plate 312 are provided with rounded corners, so that stress on the bends of the heat-conducting element 3 could be reduced and overall strength could be improved.

In an embodiment, a distance between the two side plates 311 gradually decreases from top to bottom. If planes where the two side plates 311 are located are consistent with the length of the battery module, it is reflected in that the distance between the two side plates 311 along the width of the battery module gradually decreases from top to bottom. Therefore, an angle between the first mounting portion 32 and the side plate 311, an angle between the second mounting portion 33 and the side plate 311, and angles between the side plates 311 and the bottom plate 312 are all obtuse angles, which could reduce a stress concentration phenomenon at the bends and prevent cracks or even fractures at the bends after long-term use.

In an embodiment, as shown in FIG. 4, the bottom plate 312 is a flat plate, and is arranged at a position corresponding to the opening 15 on the top cover 14. The flat plate-shaped bottom plate 312 is in plane contact with the top cover 14, so that temperature could be reliably conducted and temperature conduction speed could be increased. In order to ensure heat transfer effect, a length of the bottom plate 312 is not less than a preset size a, and a value of the preset size a needs to be determined according to the width and thickness of the heat-conducting element 3 itself.

As shown in FIG. 3 and FIG. 4, the first mounting portion 32 and the second mounting portion 33 are provided with a second bending portion 36 at positions close to the first bending portion 31, and the second bending portion 36 is convex downward relative to the plane where the first mounting portion 32 and the second mounting portion 33 are located.

Therefore, the bottom plate 312 of the first bending portion 31 and the top cover 14 may adopt an interference fit. When the bottom plate 312 of the first bending portion 31 is in contact with the top cover 14, an interference rebound will occur. Upward elastic deformation of the second bending portion 36 absorbs rebound force generated when the bottom plate 312 is in contact with the top cover 14, so that the heat-conducting element 3 and the top cover 14 could have contact pressure to ensure contact stability.

When subjected to vibration or impact, the heat-conducting element 3 would not be easy to detach, which could ensure that the bottom plate 312 and the top cover 14 are in straight surface contact rather than arc surface contact, and improve accuracy of temperature collection of the battery module during whole life cycle. However, if the temperature detection component 5 is directly disposed on the top cover 14 through a thermal pad, the temperature detection component 5 may not be mounted firmly due to the aging of the thermal pad or vibration.

For example, the second bending portion 36 may adopt a circular arc, a V-shaped or U-shaped structure, etc. In order to improve elasticity, at least two second bending portions 36 may also be provided on the first mounting portion 32 and the second mounting portion 33 at intervals or consecutively.

As shown in FIG. 4, a size of the second bending portion 36 along the height direction of the battery module is smaller than a size of the first bending portion 31 along the height direction of the battery module; and/or a size of the second bending portion 36 along the width direction of the battery module is smaller than a size of the first bending portion 31 along the width direction of the battery module.

This structure could allow the heat-conducting element 3 and the top cover 14 to have a relatively large contact area, and could also increase contact pressure between the first bending portion 31 and the top cover 14 through small deformation of the second bending portion 36. At the same time, when the first mounting part 32 and the second mounting part 33 are fixed with the mounting base 61, there would be no obvious crease or plastic deformation on the first mounting part 32 and the second mounting part 33, which could ensure mounting stability and thus improve accuracy of temperature collection.

Figure 8:
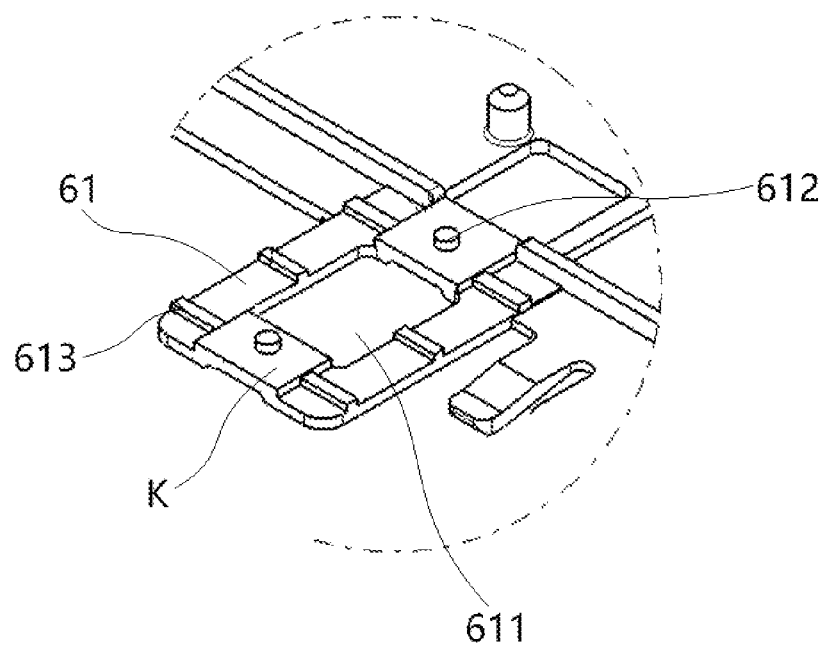
FIG. 8 is an enlarged view of part B in FIG. 7.

As shown in FIG. 7 and FIG. 8, the wire harness board 6 is provided with a mounting base 61 for disposing the heat-conducting element 3, and the mounting base 61 is provided with a first through slot 611. The heat-conducting element 3 passes through the first through slot 611 from top to bottom to be in contact with the top cover 14. Specifically, for the heat-conducting element 3 shown in FIG. 17, the first bending portion 31 passes through the first through slot 611 from top to bottom to be in contact with the top cover 14.

FIG. 3 is a schematic structural diagram of the heat-conducting element 3, and FIG. 8 is an enlarged view of part B in FIG. 7, illustrating the schematic structural diagram of the mounting base 61. In some embodiments, a positioning structure is provided between the heat-conducting element 3 and the mounting base 61 and is configured to position the heat-conducting element 3. This structure could facilitate rapid mounting of the heat-conducting element 3, improve positioning accuracy of the heat-conducting element 3, and avoid that shaking of the heat-conducting element 3 affects contact reliability; and could also improve position accuracy of the connection between the temperature detection component 5 and the circuit board 2 so as to collect temperature signals reliably.

As shown in FIG. 3 and FIG. 8, the positioning structure includes: a first through hole 34 and a positioning post 612, the first through hole 34 is provided on at least one of the first mounting portion 32 and the second mounting portion 33, and the positioning post 612 is provided on the mounting base 61 at a position corresponding to the first through hole 34. The positioning post 612 is inserted in the first through hole 34. On the basis of positioning, the first through hole 34 and the positioning post 612 are fixed by hot riveting to limit a degree of freedom of the heat-conducting element 3 to detach upward, so that the reliable fixing of the heat-conducting element 3 and the mounting base 61 could be realized.

For example, the mounting base 61 is a rectangular plate-shaped structure, the first through slot 611 is rectangular and is located in a central area of the mounting base 61, and two positioning posts 612 are located on two sides of the first through slot 611 along the width direction of the battery module.

In addition, a positioning post 612 may be provided on the first mounting portion 32 and the second mounting portion 33, and a first through hole 34 may be provided on the mounting base 61. Or the positioning structure may also adopt a clamping fit structure; for example, a clamping hook is provided on the mounting base 61, and the clamping hook is snap-fitted with the first mounting portion 32 and the second mounting portion 33 to reliably fix the heat-conducting element 3 and the mounting base 61. On the basis of disposing the clamping hook on the mounting base 61, the first mounting portion 32 and the second mounting portion 33 may also be provided with a clamping hole, and the clamping hook and the clamping hole could reliably fix the heat-conducting element 3 to the mounting base 61 through a clamping fit. Of course, the positioning structure may also adopt a toothed fitting structure.

A chamfer may be provided on an edge which is on the top of the first through slot 611 and extends along the length direction of the battery module, to avoid interference between the edge and a connection position where the first mounting portion 32 and the second mounting portion 33 are connected to the first bending portion 31, and thereby reliable contact between the bottom of the first bending portion 31 and the top cover 14 could be ensured, and accuracy of temperature detection could be improved.

Further, when the first bending portion 31 and the top cover 14 are in interference contact, the positions where the first mounting portion 32 and the second mounting portion 33 are connected to the first bending portion 31 would rise, which could also avoid interference between the heat-conducting element 3 and the edge of the first through slot 611, and ensure reliable contact between the bottom of the first bending portion 31 and the top cover 14, and improve the accuracy of temperature detection.

Figure 9:
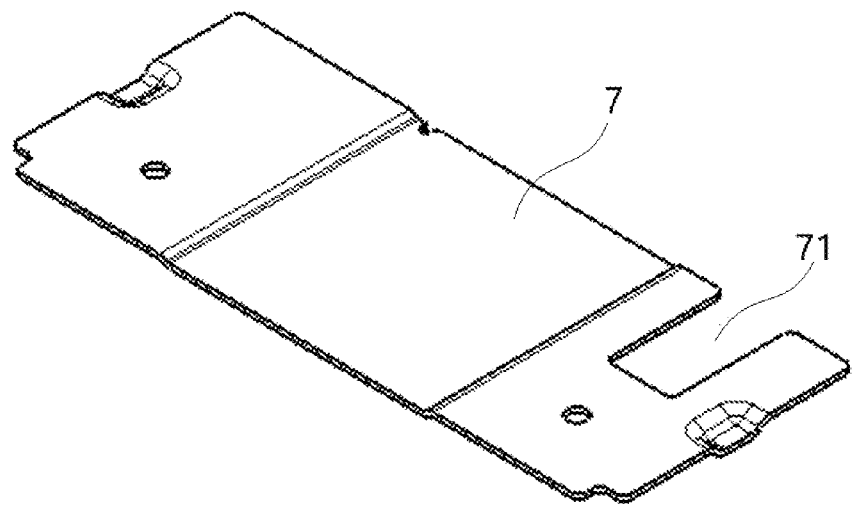
FIG. 9 is a schematic structural diagram of an embodiment of a busbar in a battery module of the present application.
Figure 10:
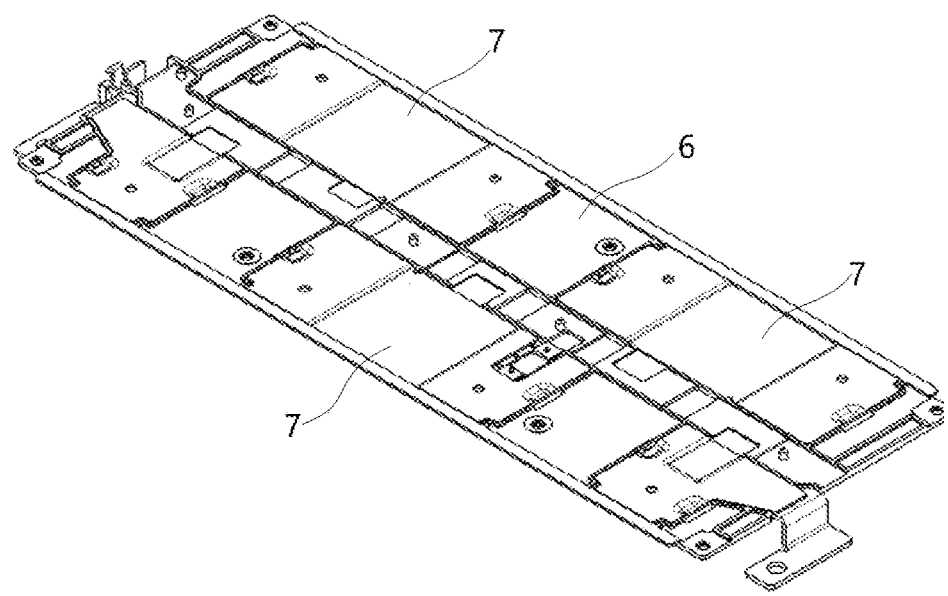
FIG. 10 is a schematic structural diagram of an embodiment in which a busbar is mounted on a wire harness board in a battery module of the present application.

As shown in FIG. 9 and FIG. 10, the battery module of the present application further includes a busbar 7 disposed on the wire harness board 6, and the busbar 7 is pressed on the upper surface of the mounting base 61. The busbar 7 is connected to the electrode terminals of an adjacent battery unit 1, and is configured to realize series or parallel connection of the battery units 1. The wire harness board 6 is configured to support the busbar 7 and the circuit board 2.

The busbar 7 is provided with a second through slot 71 that faces the circuit board 2, and the second through slot 71 is configured to avoid the heat-conducting element 3. In this kind of battery module, a second through slot 71 is disposed on the busbar 7 to leave room for mounting the heat-conducting element 3, and also leave a passage for the heat-conducting element 3 to reach the top cover 14.

As shown in FIG. 8, a rib 613 is provided in a contact area of the mounting base 61 with the busbar 7, and the busbar 7 is in contact with a top surface of the rib 613. Specifically, a plurality of ribs 613 are arranged at intervals on areas on both sides of the first through slot 611 on the mounting base 61. Using the rib 613 to support can reduce the contact area between the wire harness board 6 and the busbar 7 and reduce heat transferred from the busbar 7 to the wire harness board 6.

An assembly process of the battery module of the present application will be described in detail below.

1. As shown in FIG. 5 and FIG. 6, the flexible circuit board 2 is spread with its back facing upwards, the first end of the heat-conducting element 3 is placed on a preset mounting area, and the temperature detection component 5 is soldered to the circuit board 2 from the mounting hole 35, and the thermally conductive adhesive 37 is filled between the temperature detection component 5 and the mounting hole 35.

Figure 11:
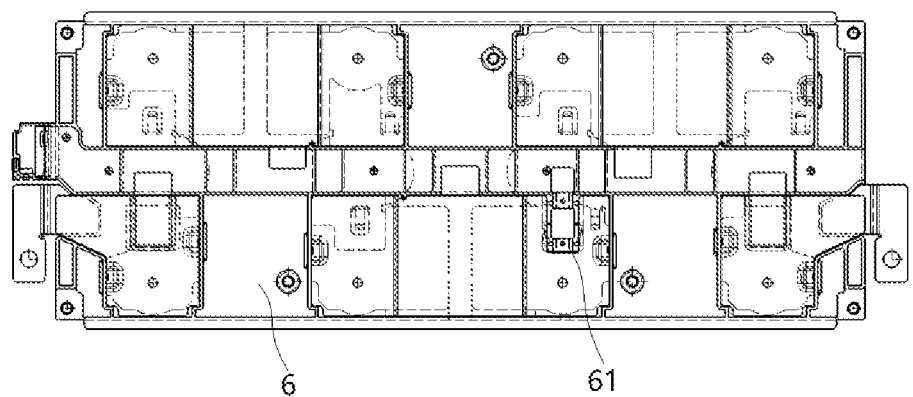
FIG. 11 is a schematic structural diagram of an embodiment in which a busbar is pressed tightly on ribs in a battery module of the present application.

2. As shown in FIG. 11, the busbar 7 is assembled to a corresponding position on the wire harness board 6, and the width of the second through slot 71 opened on the busbar 7 is smaller than the width of the mounting base 61, so as to ensure that the busbar 7 could tightly press the mounting base on the wire harness board 6.

Figure 12:
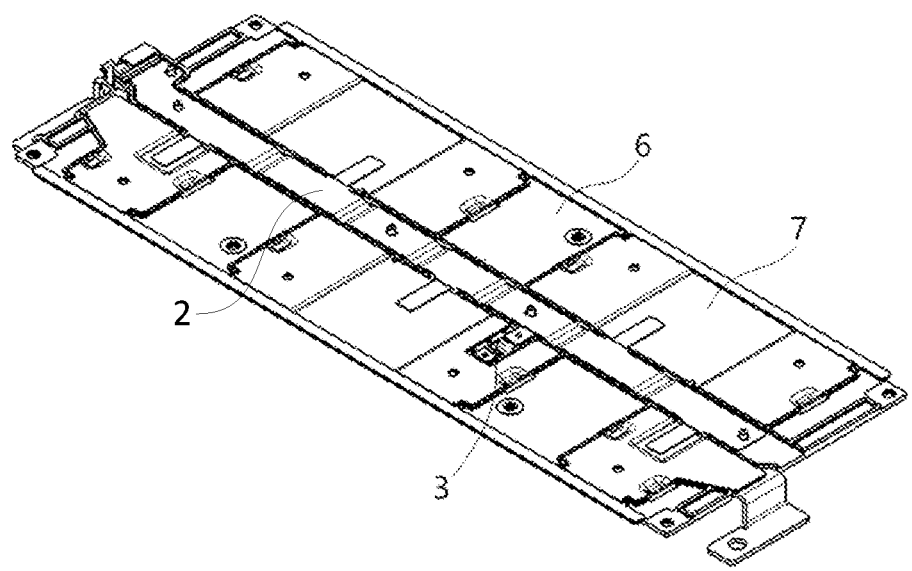
FIG. 12 is a schematic structural diagram of an embodiment in which a wire harness board, a circuit board, a heat-conducting element, and a busbar are assembled to form a wire harness board assembly in a battery module of the present application.
Figure 13:
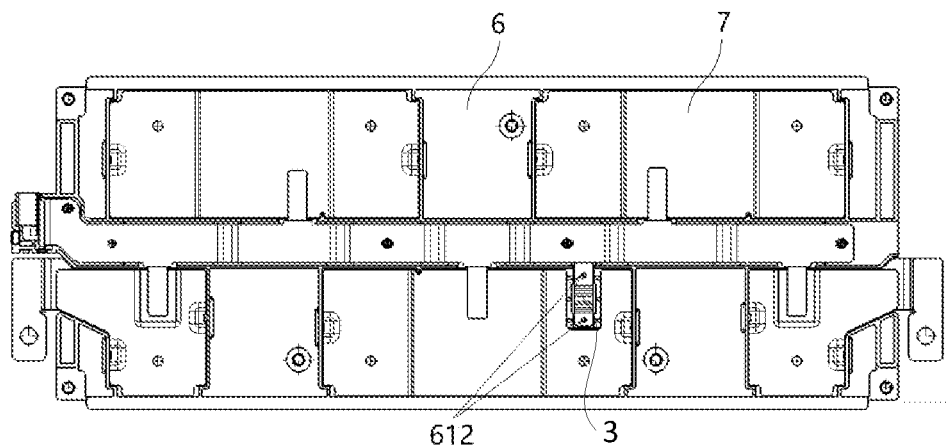
FIG. 13 is a schematic structural diagram of an embodiment in which a heat-conducting element is fixed to a wire harness board in a battery module of the present application.

3. As shown in FIG. 12 and FIG. 13, a circuit board assembly obtained from step 1 is assembled to the wire harness board 6, so that the positioning posts 612 pass through two first through holes 34 on the heat-conducting element 3, and hot riveting is performed.

Figure 15:
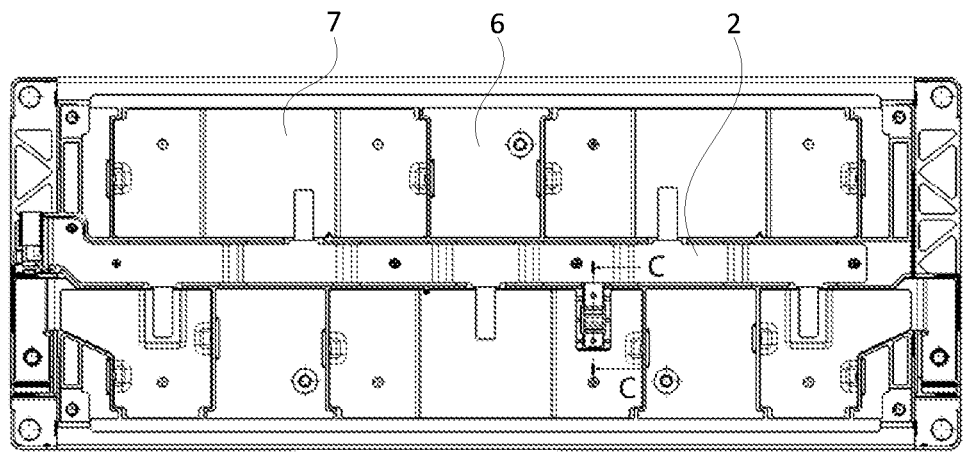
FIG. 15 is a top view of the battery module shown in FIG. 14.

4. As shown in FIG. 14 and FIG. 15, a wire harness board assembly obtained from steps 1-3 is assembled with the battery units 1, and the busbar 7 is welded to the electrode terminals, then the height of the busbar 7 is limited, and thus the wire harness board 6 is fixed by pressing the rib 613 through the busbar 7, and therefore the position of the heat-conducting element 3 is also limited by the hot riveting position.

Figure 16:
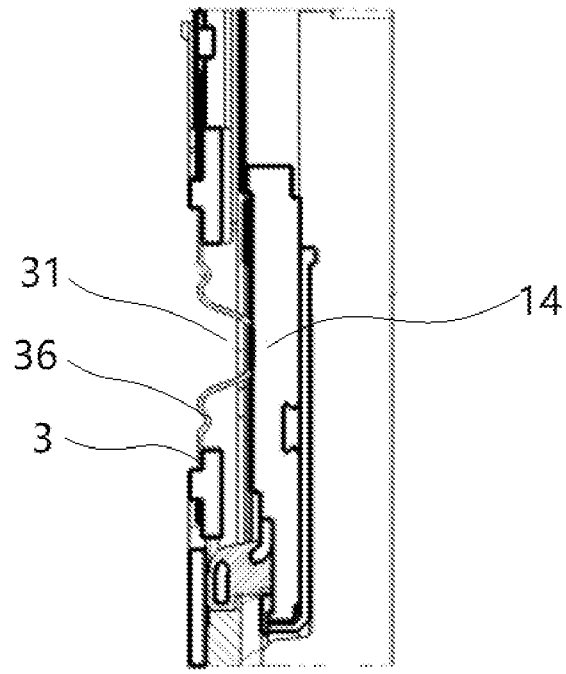
FIG. 16 is a cross-sectional view along C-C in FIG. 15.
Figure 17:
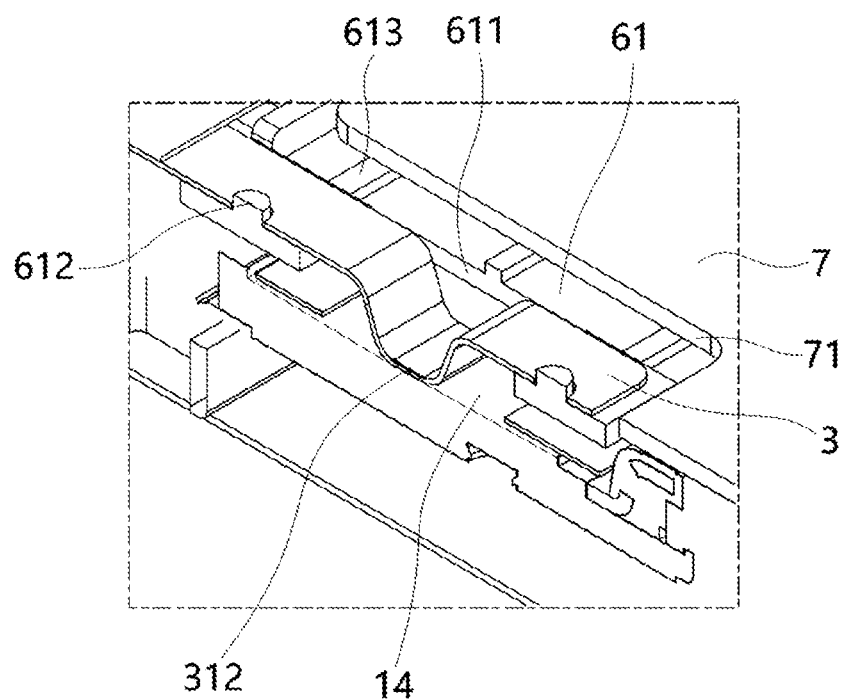
FIG. 17 is a sectional view of mounting of the heat-conducting element in the battery module shown in FIG. 14.

With reference to FIG. 16 and FIG. 17, the first bending portion 31 of the heat-conducting element 3 passes through the first through slot 611 and presses and contacts the top cover 14 of the battery unit 1 through the bottom plate 312, and the rebound force generated by the bottom plate 312 is absorbed by the second bending portion 36, and the contact stability between the bottom plate 312 and the top cover 14 could be ensured.

Temperature detection principle of the battery module is as follows: the temperature inside the battery unit 1 is transferred to the top cover 14, and is transferred to the temperature detection component 5 via the bottom plate 312, the side plate 311, the first mounting portion 32 and the thermally conductive adhesive 37 in turn, so as to realize the detection of the temperature of the top cover 14. The temperature collection circuit in the circuit board 2 receives a temperature signal of the temperature detection component 5 and converts it into an electrical signal. A controller judges whether a temperature value detected by the temperature detection component 5 exceeds a preset temperature, and if so, power limitation is performed for safety protection.

An embodiment of the present application also provides an apparatus, which includes a battery module as described above, and the battery module is configured to provide electric energy. The apparatus may be a vehicle or an energy storage device.

The battery module provided by the present application is described in detail above. The principle and implementations of the present application are explained by using specific embodiments herein. The above embodiments are only configured to help understand the method and its core ideas of the present application. It should be noted that, for those of ordinary skill in the art, several improvements and modifications can be made to the present application without departing from the principles of this application, and these improvements and modifications also fall within the protection scope of the claims of the present application.

What is claimed is:

1. A battery module, comprising:
   a plurality of battery units arranged side by side along a length direction of the battery module, and each of the battery units comprising a top cover;
   a circuit board disposed above the top cover in a height direction, the circuit board being provided with a temperature collection circuit;
   a heat-conducting element, a first end of the heat-conducting element being connected to the circuit board, and at least part of the heat-conducting element being in contact with the top cover,
   a temperature detection component disposed on the heat-conducting element and signal-connected to the temperature collection circuit, the temperature detection component being configured to collect a temperature of the top cover;
   a wire harness board disposed on the top cover along the height direction, the wire harness board comprising a mounting base, wherein the circuit board is disposed on the wire harness board, and a second end of the heat-conducting element is disposed on the mounting base; and
   a busbar disposed on the wire harness board, the top cover being provided with electrode terminals, and the busbar being connected to the electrode terminals of an adjacent battery unit, the busbar being provided with a second through slot configured to avoid the heat-conducting element, and the busbar being pressed on an upper surface of the mounting base.

2. The battery module according to claim 1, wherein the heat-conducting element comprises:
   a first bending portion configured to be at least partially in contact with the top cover; and
   a first mounting portion and a second mounting portion, respectively located at two ends of the first bending portion along a width direction of the battery module, and configured to be fixed to the wire harness board, and an end of the first mounting portion away from the first bending portion serving as the first end of the heat-conducting element and being fixed to the circuit board and mounted with the temperature detection component;
   wherein the first bending portion is convex downward relative to a plane where the first mounting portion and the second mounting portion are located.

3. The battery module according to claim 1, wherein the heat-conducting element is formed by bending an elongated plate-shaped structure.

4. The battery module according to claim 2, wherein the first bending portion comprises:
   a bottom plate being in contact with the top cover; and
   two side plates, upper ends of the two side plates being connected to the first mounting portion and the second mounting portion, respectively, and lower ends of the two side plates being connected with two ends of the bottom plate, respectively.

5. The battery module according to claim 4, wherein a distance between the two side plates gradually decreases from top to bottom, and the bottom plate is a flat plate.

6. The battery module according to claim 2, wherein each of the first mounting portion and the second mounting portion is provided with a second bending portion, the second bending portion is convex downward relative to the plane where the first mounting portion and the second mounting portion are located.

7. The battery module according to claim 6, wherein a size of the second bending portion along the height direction of the battery module is smaller than a size of the first bending portion along the height direction of the battery module.

8. The battery module according to claim 6, wherein a size of the second bending portion along the width direction of the battery module is smaller than a size of the first bending portion along the width direction of the battery module.

9. The battery module according to claim 1, wherein a positioning structure is provided between the heat-conducting element and the mounting base, and is configured to position the heat-conducting element.

10. The battery module according to claim 2, wherein a positioning structure is provided between the heat-conducting element and the mounting base, and the positioning structure comprises:

a first through hole, disposed on at least one of the first mounting portion and the second mounting portion; and a positioning post disposed at a position corresponding to the first through hole on the mounting base, the positioning post being inserted in the first through hole.

11. The battery module according to claim 1, wherein the mounting base is provided with a first through slot, and the heat-conducting element is configured to pass through the first through slot from top to bottom to be in contact with the top cover.

12. The battery module according to claim 1, wherein the mounting base is provided with a rib in an area in contact with the busbar, and the busbar is in contact with a top surface of the rib.

13. The battery module according to claim 1, wherein a first end of the heat-conducting element connected to the circuit board is provided with a mounting hole, and the temperature detection component is located in the mounting hole and signal-connected to the temperature collection circuit of the circuit board.

14. The battery module according to claim 12, wherein an area between the mounting hole and the temperature detection component is filled with a thermally conductive adhesive.

15. An apparatus, comprising a battery module according to claim 1, the battery module being configured to provide electrical energy.

16. A battery module, comprising:
a plurality of battery units arranged side by side along a length direction of the battery module, and each of the battery units comprising a top cover;
a circuit board disposed above the top cover in a height direction, the circuit board being provided with a temperature collection circuit;
a heat-conducting element, a first end of the heat-conducting element being connected to the circuit board, and at least part of the heat-conducting element being in contact with the top cover;
a temperature detection component disposed on the heat-conducting element and signal-connected to the temperature collection circuit, the temperature detection component being configured to collect a temperature of the top cover;
a wire harness board disposed on the top cover along the height direction, the wire harness board comprising a mounting base, wherein the circuit board is disposed on the wire harness board, and a second end of the heat-conducting element is disposed on the mounting base, wherein the heat-conducting element comprises:
a first bending portion configured to be at least partially in contact with the top cover; and
a first mounting portion and a second mounting portion, respectively located at two ends of the first bending portion along a width direction of the battery module, and configured to be fixed to the wire harness board, and an end of the first mounting portion away from the first bending portion serving as the first end of the heat-conducting element and being fixed to the circuit board and mounted with the temperature detection component;
wherein the first bending portion is convex downward relative to a plane where the first mounting portion and the second mounting portion are located.

17. The battery module according to claim 16, wherein the first bending portion comprises:
a bottom plate being in contact with the top cover; and
two side plates, upper ends of the two side plates being connected to the first mounting portion and the second mounting portion, respectively, and lower ends of the two side plates being connected with two ends of the bottom plate, respectively.

18. The battery module according to claim 17, wherein a distance between the two side plates gradually decreases from top to bottom, and the bottom plate is a flat plate.

19. The battery module according to claim 16, wherein each of the first mounting portion and the second mounting portion is provided with a second bending portion, the second bending portion is convex downward relative to the plane where the first mounting portion and the second mounting portion are located.

20. The battery module according to claim 16, wherein a first end of the heat-conducting element connected to the circuit board is provided with a mounting hole, and the temperature detection component is located in the mounting hole and signal-connected to the temperature collection circuit of the circuit board.

* * * * *